SIGNAL STORAGE AND TRANSFER SYSTEM

Filed Jan. 16, 1961 3 Sheets-Sheet 1

INVENTOR.
David John Norton
BY W. L. Stout
HIS ATTORNEY

SIGNAL STORAGE AND TRANSFER SYSTEM

Filed Jan. 16, 1961 3 Sheets-Sheet 2

INVENTOR.
David John Norton
BY D. L. Stout
HIS ATTORNEY

INVENTOR.
David John Norton
BY
W. L. Stout.
HIS ATTORNEY

United States Patent Office 3,235,852

Patented Feb. 15, 1966

3,235,852

SIGNAL STORAGE AND TRANSFER SYSTEM

David John Norton, Winchester, England, assignor to Westinghouse Brake and Signal Company Limited, London, England Filed Jan. 16, 1961, Ser. No. 83,023

Claims priority, application Great Britain, Jan. 18, 1960, 1,762/60

11 Claims. (Cl. 340—174)

Figure 1:
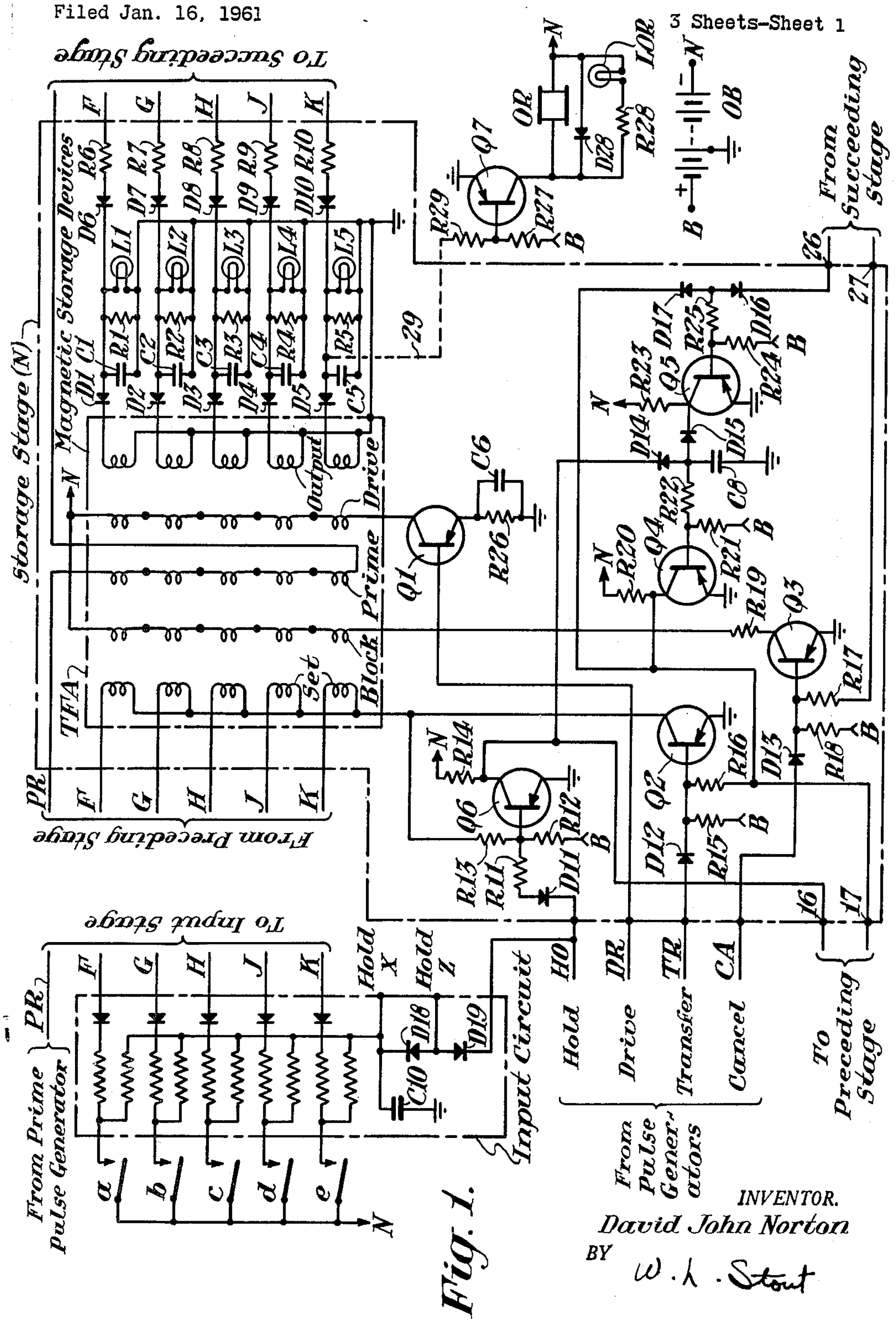

My invention relates to a signal storage and transfer system. More particularly, my invention relates to a system by which discrete signals supplied to one storage stage of a sequentially arranged series of such storage stages can be transferred and advanced in turn to all the subsequent storage stages of the series.

Magnetic storage devices are at the present time commonly used as information storage means in computers, information storage systems, and various other apparatus. In such systems, the information may be stored in these magnetic devices for varying periods of time. Such information storages may be held in single magnetic storage units or in banks of such devices in order to provide multi-digit information storage. The use of this type of information storage in train designation systems provides distinct advantages over other types of train designation storage. Some of these magnetic storage devices require a continuous input in order to hold the information stored. Other and more preferable types require only a short, discrete input pulse and no holding power for retaining the information. In these latter type devices, the information is retained within the device because of the distinct magnetic properties thereof. One specific example of the type device which requires only a short input pulse and retains the information stored due to the characteristics of its magnetic circuit is the Transfluxor unit such as described in the Proceedings of the IRE for March 1956, at page 321. Other similar devices having equivalent characteristics are available and this particular device is cited here as a specific example only. It may be noted that the specific showing of the system of my invention hereinafter described is based on the use of Transfluxor units but equivalent units may be used in lieu thereof with only conventional modifications to the specific circuits. Devices having such characteristics are obviously preferable in magnetic storage systems when the information input is in the form of discrete signals, that is, separate signals having relatively short duration. Such devices are also used when it becomes advantageous to make each storage stage store at least a portion of its output to facilitate the operation of the respective stages as required by the coded signals. When devices of this type or circuit arrangements including them are used, the control arrangement must satisfy the requirement to advance the signal from one stage to the succeeding storage stage only for a particular combination of conditions. Furthermore, the control must assure that, upon the transfer of a discrete signal from one stage to the succeeding stage, the particular stage from which it is transferred is then rendered devoid of any signal so that it is thereafter in a suitable condition to receive a subsequent signal from preceding stages of the system.

Accordingly, an object of my invention is a signal storage and transfer system using magnetic storage devices in each stage thereof.

Another object of my invention is an improved control arrangement for information storage and transfer systems which permit the transfer of information from stage to succeeding stage only when preselected conditions exist.

A further object of my invention is an improved storage and transfer system for discrete signals employing controllable conductivity devices to actuate and control the transfer of the signals from a storage stage to the succeeding stage.

Still an other object of my invention is an improved arrangement for transferring discrete signals through a series of successive storage stages, each of which stages comprises a magnetic storage device.

It is also an object of my invention to provide an improved system for transferring a multi-digit information signal through a series of successive storage stages, each stage comprising a bank of magnetic storage devices requiring only discrete input pulses of limited duration to receive, store, and retain the appropriate signal.

A further object of my invention is an improved signal transfer system using transistors and other semi-conductors to control the transfer from storage stage to successive stage only when preselected conditions exist.

Yet another object of my invention is a method of controlling a signal transfer system in which discrete signals are transferred from bank to successive storage bank, the method utilizing a repetitive cycle of alternate quiescent periods and operational periods, each of sufficient duration to enable the operational components of the storage stages to assume a steady state condition of operation in response to the discrete input supplied to that stage.

Other objects, features, and advantages of the system of my invention will become apparent from the following specification and appended claims when taken in connection with the accompanying drawings.

Referring now to the drawings, FIG. 1 thereof is a diagrammatic circuit diagram of a single storage stage of a signal transfer system embodying one form of my invention.

Figure 2:
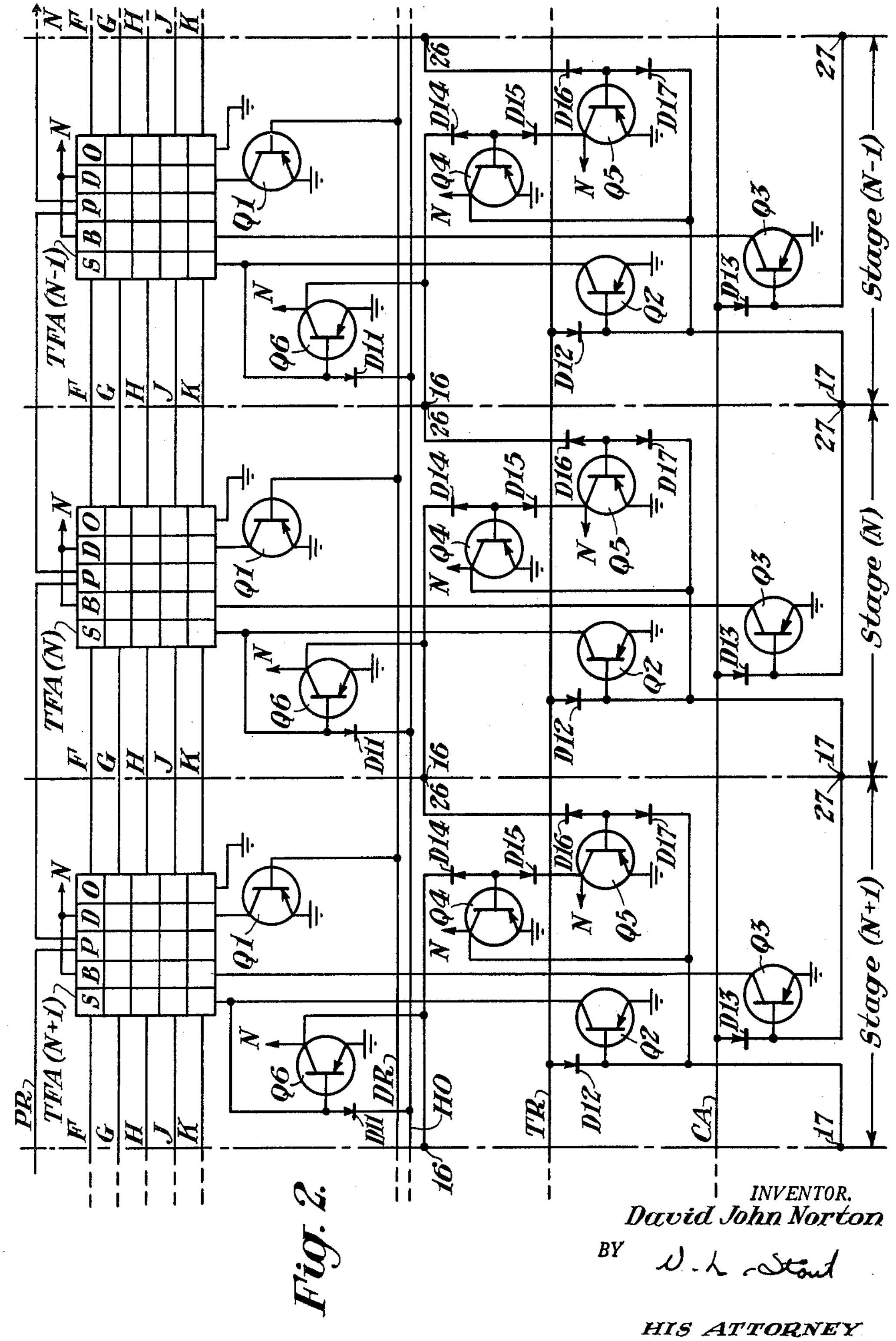

FIG. 2 of the drawings illustrates, in diagrammatic fashion, three successive storage stages of the signal transfer system using the form of FIG. 1 but with the circuitry simplified to illustrate operational principles rather than circuit details.

Figure 3:
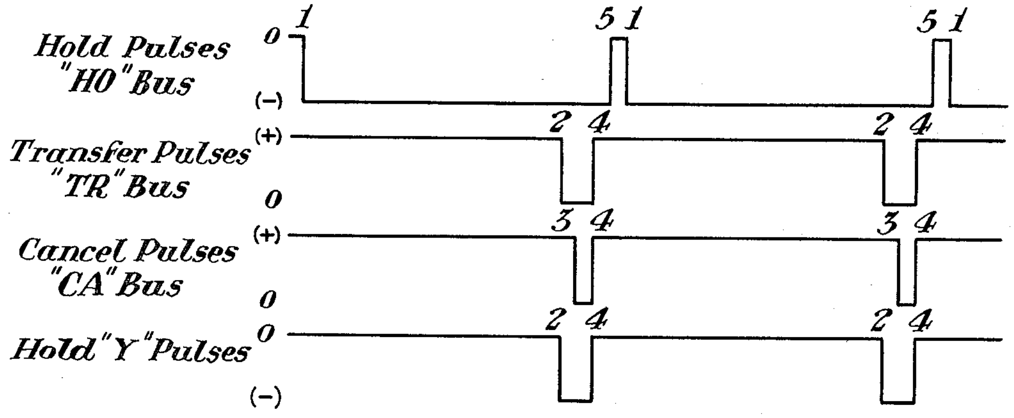

A preferred wave-form for the input pulses which control the timing of the system operation of the form shown in FIGS. 1 and 2 is shown in FIG. 3.

Figure 4:
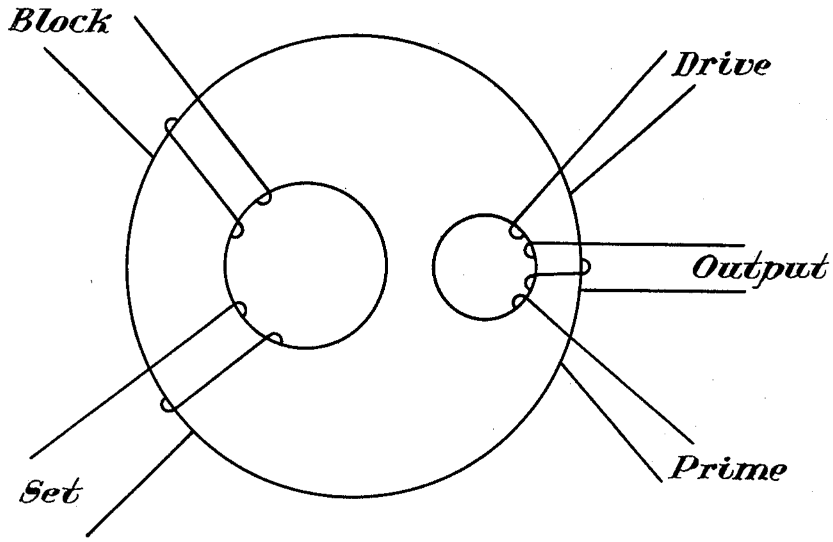

FIG. 4 is a schematic illustration of a plan view of a magnetic storage device which may be used for each level of the storage banks shown in FIGS. 1 and 2.

In each of the drawings, similar reference characters refer to similar parts of the apparatus.

In practicing my invention, I provide a series of successive signal storage stages. Each stage comprises principally a magnetic storage device or, as illustrated, a bank of such devices for the preferred multi-digit storage arrangement. As specifically illustrated in the drawings, these magnetic storage devices are of the Transfluxor type. Obviously, other types of such storage devices having equivalent characteristics and operation may be used with proper modifications of the circuits. Associated with each storage device, as another part of the stage, is a transfer control circuit arrangement. As shown, the arrangement comprises six transistors and various other semi-conductor devices. This arrangement controls the transfer of the signals into the associated storage stage and into the succeeding stage. A check is also made of the preceding stage prior to the transfer in order to assure that a signal is available for transfer and that other conditions are proper. In other words, the transistor circuits are responsive to the occupied and empty or unoccupied condition of the preceding and the associated storage stage, respectively, to actuate the transfer action. The transistor circuits are also responsive to timing pulses supplied from external pulse generators. These pulses are so arranged as to provide a cycle of operation which includes a quiescent period during which the various apparatus assumes steady state conditions and then an operational period during which the signal transfer may occur. Said in another way, the transfer of the signal from stage to stage occurs only during the operating period of the pulse cycle providing other conditions, such as the occupied and unoccupied conditions of the stages, are proper. More specifically, master and busy transistors of the control arrangement, by their condition of conductivity at various times, indicate whether the associated storage device is occupied or unoccupied. Another of the transistors, in accordance with the occupancy condition of the stage, as determined by the master and busy transistors, responds to certain of the timing pulses to initiate transfer action. At the proper time in the operating period of the cycle, a transfer transistor, previously primed, becomes conducting to complete the transfer action from the preceding stage. This is followed shortly by the actuation of a cancel transistor in the corresponding arrangement in the preceding stage to cancel the storage of the signal from that preceeding stage to prepare for further transfer action. Special timing pulses are also provided for the initial input and immediately succeeding storage stages to enable the signals from the source of information to be immediately stored as they are originated.

I shall now describe the form of my invention as shown in the accompanying drawings and shall then point out the novel features thereof in the appended claims.

In the drawings, all of the transistors are shown as being of the P-N-P junction type. Additionally, all of the diodes are illustrated as being half-wave rectifiers of any common type. Obviously, to those skilled in the art, N-P-N junction type transistors and other forms of diodes may be used, these substitutions requiring conventional shifts in the energy supply connections which are well known. It is to be understood that the use of either type of transistors and of the various forms of diodes is considered to be included in my invention. All of the apparatus shown in FIGS. 1 and 2 is supplied with direct current energy from a conventional source. For example, this source may be a battery such as the battery OB shown in the lower right of FIG. 1, whose positive and negative terminals are designated by the conventional reference characters B and N, respectively. In addition, an intermediate tap of the battery is connected to the system ground, shown by conventional grounding symbol. Where these references, i.e., B, N, and the ground symbol, appear elsewhere in the circuits of FIG. 1 and FIG. 2, a connection to the corresponding terminal of battery OB is indicated and will be considered as made without further discussion.

Referring now to FIG. 1, a single storage stage of the system of my invention is shown, the apparatus comprising the storage stage being that enclosed by the dot-dash line designated as storage stage N. In the following description, it is considered that the preceding storage stage is designated $(N+1)$ while the succeeding stage is designated $(N-1)$. In other words, the storage stages are numbered in reverse order of information flow, the input or initial stage having the highest number. For example, in a system having 10 storage stages, the initial input stage is stage 10 while the final stage in the series is stage 1. This is further illustrated in FIG. 2 where three storage stages are shown in simplified form, designated left to right as stages $(N+1)$, N, and $(N-1)$, the direction of signal transfer being also from left to right. The principal storage means of this stage in FIG. 1 is the magnetic storage device illustrated conventionally by the inner dot-dash block designated by the reference character TFA. This magnetic storage device is shown as comprising a bank or assembly of Transfluxor units, there being five levels, each comprising a single such unit. As previously described, other equivalent magnetic storage devices may be used in other forms of the system of my invention. Each Transfluxor unit or level shown within the block TFA comprises five coils or windings, designated from left to right as the set winding, the block (cancel) winding, the prime winding, the drive winding, and finally the output winding. In the diagram of FIG. 4, a schematic physical layout of such a unit is illustrated for purposes of ready reference. However, for a full understanding of the operation of such devices, reference is made to the previously mentioned published article. In the following paragraphs, only a very brief description is given of the operation of these devices as it is believed that, by reference to the published article, a full understanding may be obtained as desired.

The prime windings of the five units of assembly TFA are connected in series, as may be noted in the drawing of FIG. 1. In addition, this series connection is further connected in series with the prime windings of the banks in other storage stages and thence to the prime pulse generator through prime pulse bus PR. This generator thus supplies pulses to all of the prime windings at the same time. The drive windings of the five units of assembly TFA in FIG. 1 are likewise connected in series. This series connection is connected between terminal N and the collector of transistor Q1 and thus comes under the control of the drive pulse generator through connection of the base of transistor Q1 to drive pulse bus DR. Transistor Q1 is used in this control arrangement as an amplifier to assure sufficient energy to cause the drive windings to activate the output from the corresponding Transfluxor units. Transistor Q1 is normally biased to cut-off, by the resistor R26-capacitor C6 parallel arrangement connected between its emitter and ground, and conducts current only when the drive pulse is applied from bus DR. When transistor Q1 conducts, current obviously flows from the ground terminal through the emitter-collector path of the transistor and the drive windings of assembly TFA connected in series to terminal N of the source. Both the drive and the prime pulses are of short time duration and occur at a relatively high frequency when compared with the other pulses to be discussed hereinafter. Through the use of transistor Q1, the drive pulses actually applied to the drive windings of assembly TFA are of relatively large magnitude when compared with the priming pulses supplied over bus PR to the prime windings. This difference in magnitude is required for proper operation of such units, as explained in the previously mentioned published article.

The block windings of assembly TFA are likewise connected in series between terminal N and the ground terminal with the emitter-collector path of transistor Q3 and resistor R19 inserted in this series circuit. The supply of energy to the block windings is thus controlled by transistor Q3 which is normally biased to cut-off by a connection from its base to terminal B through resistance R18. It will be noted that similar bias connections are made to the base of other transistors in the arrangement, with the exception of transistor Q1, in order that transistors are normally biased to cut-off when other potentials are not supplied to the base connection. Also, the emitter of each transistor is connected directly to the ground terminal, again with the exception of transistor Q1 where the previously mentioned resistor-capacitor arrangement is inserted in the ground connection. The base of transistor Q3 is also connected through diode or rectifier D13 to the cancel pulse bus CA. Other controls for transistor Q3 will be discussed later.

The chart of FIG. 3 illustrates the wave form of the pulses supplied over bus CA. These pulses and the others whose wave form is shown in this chart are obtained from a pulse generator or generators of any conventional design. Preferably, the pulse generator is a transistorized multivibrator arrangement with timing circuits to provide the time relationship shown in the chart of FIG. 3. This generator is not shown in detail, several well known arrangements being available, any of which may be used, as will be understood by those skilled in the art. Since the pulse generators are not a part of my invention as such, it is believed that an illustration of the wave form and timing sequence as shown in the chart of FIG. 3 is sufficient for an understanding of the system. The priming and driving pulses are obtained from similar generators which likewise may be of any conventional circuit arrangement. However, the prime and drive pulses occur continuously at a relatively high frequency when compared with the pulses shown in FIG. 3.

One end of each of the set windings of assembly TFA, in multiple with the similar ends of the other set windings, is connected to the collector of transistor Q2. The base of this transistor is connected through rectifier D12 to the transfer pulse bus TR. Transistor Q2 is obviously biased to cut-off under normal conditions by the connection from its base to terminal B through resistor R15. Another connection from the base through resistor R16 to other controls will be discussed later. The other end of each set winding is connected to a different one of the set buses, from the preceding stage, designated by the reference characters F, G, H, J, and K. Each of these buses is connected in the preceding stage to the output winding of the corresponding magnetic unit of that preceding stage. Signals are received at selected times over these buses in accordance with the signals stored in that preceding stage. Thus, when transistor Q2 becomes conducting, as will be described later, current flows through the set windings to which these signals have been applied from the preceding stage to cause a similar setting of the signal or code combination into the assembly TFA of stage N. The entry transistor Q6 is provided with a connection from its base through resistor R13 to the common lead from the set windings of assembly TFA. The base of transistor Q6 is also connected through resistor R11 and rectifier D11 to the hold pulse bus HO. The wave form of the pulses over this bus and also over bus TR are shown in the chart of FIG. 3. The usual bias connection to terminal B is provided at the base of transistor Q6 through resistor R12. Transistor Q6 serves to control the transfer of signals from the preceding stage into the subject stage N in accordance with the occupancy conditions in the corresponding stages. Full details of this transfer action will be described later during the more detailed description of the operation. It will be noted that the collector of transistor Q6 is connected to terminal N through resistor R14 while a tap is taken from the junction between the collector and resistor R14 for control purposes in this stage and the preceding stage, the details of which will be described later.

One end of each of the output windings of the storage devices is connected to the ground terminal. The other end of the various output windings are connected respectively to set buses F to K extending to the succeeding storage stage. These buses are connected to the set windings in the next stage in the manner illustrated in FIG. 2. It is to be noted that the corresponding set and output windings between adjacent stages are so connected by these set buses and other connections that the output through the set bus is a negative pulse. This properly biases the rectifiers in the circuit to allow transmission of the stored signal. For example, rectifiers D1 and D6, in set bus F shown in FIG. 1 extending to the succeeding stage, are so positioned as to their low resistance direction that a negative pulse produced by the output winding of the top level of assembly TFA will be transmitted to the corresponding set winding in the succeeding stage. Various lamps, capacitors, and resistors are connected in parallel across each of the output circuits to provide a smooth operation of the transfer action. For example, capacitor C1, resistor R1, and lamp L1 are connected in multiple from set bus F to the ground terminal and thus across the output circuit of the upper unit of assembly TFA. The quiet period in the pulsing cycle allows the capacitors, rectifiers, and indicator lamps to attain a steady state condition to provide this smooth transfer operation.

In the final stage of the system and for other stages in which a recorded indication is desired, an output relay may be connected to each output winding. An example is shown in conventional manner for the output from bus K of assembly TFA. The connection illustrated by dotted line 29 extends through resistor R29 to the base of an output transistor Q7. When connection 29 is used, resistor R5 and lamp L5 are eliminated. Rectifier D10 and its associated resistor R10 in set bus K are also eliminated if no succeeding stage exists but this apparatus will be continued in use if succeeding stages are to receive the storage as well as the output apparatus. Transistor Q7 is normally biased to cut off by a base connection to terminal B through resistor R27. However, when a negative pulse or potential is applied through connection 29 from set bus K to the base of transistor Q7, this transistor changes to its conducting condition. At this time, relay OR is energized by the circuit traced from the ground terminal through the emitter-collector path of transistor Q7 and the winding of relay OR to terminal N. Contacts of relay OR may then be used to provide a visual indication or other registry of the stored signal. The lamp LOR, resistor R28, and rectifier D28 are connected in series-multiple arrangement across the winding of relay OR to provide smooth operation of the registry apparatus.

The other transistors provided in the control circuit arrangement are the master transistor Q4 and the busy transistor Q5. Each of these transistors is normally biased to cut-off by connection from the base to terminal B through resistors R21 and R24, respectively. The collector of each transistor is connected to terminal N through resistors R20 and R23, respectively, while the emitters are connected directly to the ground terminal. The other controls of these two transistors are better understood by the full description of the operation of the system which will be given later. It may be noted, however, that interstage connections through terminals 16 and 17 to the preceding stage and terminals 26 and 27 from the succeeding stage are involved in the control of these last two transistors as well as certain of the transistors previously mentioned.

Illustrated in the upper left of FIG. 1 is a form of the input circuit arrangement for the overall system. Contacts *a* to *e* are closed in code combination in accordance with the input desired. For example, these contacts may indicate, by the combination closed, a train designation as it approaches a station location or as it passes through a railroad interlocking. These contacts may be controlled manually by an operator or, in a more automatic arrangement, by a train identification system, such as are well known in the art. Complete operation of the input arrangement will be described hereinafter during the operational description of the system.

Three adjacent storage stages are shown in FIG. 2, the stages $(N+1)$, N, and $(N-1)$, as previously mentioned. The circuit arrangement shown in this figure of the drawings is greatly simplified. For example, no positive bias connections to the bases of the various transistors are shown and no resistors or lamps are included in any of the circuit connections. The bias connections and circuit elements are, of course, actually as shown in FIG. 1 but, for purposes of easier understanding and simplified description, have been omitted from this larger section of the system of my invention. The magnetic storage devices for each stage as shown by conventional block diagram, each level of the bank assembly TFA being shown with one block for each winding of the device used. The bus connections between storage devices or the banks of storage devices are indicated by single line connections. The terminals on the dot-dash lines separating the adjacent stages have been marked with double reference characters to indicate the entry into the left stage and the exit from the right stage to correspond with the reference characters given to corresponding terminals in the complete circuit arrangement shown in FIG. 1. In addition, all other references in FIG. 2 correspond to the references for similar apparatus in FIG. 1 as appropriate. Likewise, the same reference character has been applied to identical apparatus in each storage stage of the circuits of FIG. 2. However, in the following description, references will be distinguished when necessary by suffixing the stage designation.

I shall now describe the operation of the system of my invention using the circuits shown in FIGS. 1 and 2 interchangeably as appropriate in the operational description. Referring first to the wave form chart of FIG. 3, the upper three wave forms indicate the pulses received over bus connections HO, TR, and CA, respectively, which, as will appear, have multiple connections to the various stages of the system. The cycle of pulse operation may be considered to be, referring to the wave form for the hold pulses, from wave form condition 1 through the pulse periods to the next occurrence of the similar wave form condition 1. However, if desired, other limits may be used for the cycle, such as from condition 5 to the next condition 5. It is to be noted that a relatively long quiescent period exists from condition 1 to the occurrence of condition 2 when a transfer pulse appears. This period is to allow the lamps and diodes and/or rectifiers to assume their steady state condition of operation. In one specific installation, the total cycle, that is, from condition 1 to the next condition 1, is on the order of approximately 400 milliseconds in length. With this cycle length, each short period, such as condition 2 to condition 3, 3, to 4, 4 to 5, and 5 to 1, is approximately 20 milliseconds in length. It has already been mentioned that the prime and drive pulses, which are obtained from separate generators, occur at a relatively higher frequency, their occurrence also being continuous in nature, that is, no quiescent periods. Since, as is obvious from the wave form chart, the potential on pulse buses TR and CA is predominantly positive in nature, this potential acts as a clamping potential or pulse holding the corresponding transistors, that is, transistors Q2 and Q3, respectively, cut-off or non-conducting in condition. The potential on hold pulse but HO is predominantly negative so that transistors connected to this bus are normally in a conducting state. It will be noted, in FIG. 2, that the stages are connected in multiple to these buses HO, CA, and TR, and also to bus DR supplying the driving pulses, although this latter will not be specifically discussed in the following description.

I shall assume as a specific condition that, as condition 2 in the wave form chart of FIG. 3 occurs, stage $(N+1)$ receives a signal from the immediately preceding stage and that stage N is already empty. For purposes of having a specific reference, it is further assumed that this signal is stored in levels F and J of assembly TFA $(N+1)$. At wave form condition 2, the negative potential on bus HO is sufficient to overcome the positive bias on the various transistors Q6 so that potential on the base of these transistors is negative. These transistors are thus in the conducting condition. At this time, in stage N, transistor Q4 is conducting since associated transistor Q5 is at present cut-off. This latter state results from the lack of negative potential over the connections from the collector of transistor Q6$(N-1)$ through terminal 16/26 and rectifier D16(N) to the base of transistor Q5(N). Referring briefly to FIG. 1, the positive bias applied to the base of transistor Q5 through resistor R24 is thus sufficient to hold this transistor nonconducting or cut-off. With the collector of transistor Q5(N) at approximately the potential of terminal N, negative potential is applied from the common junction of resistor R23 and the collector of transistor Q5 through rectifier D15 and resistor R22 to the base of associated transistor Q4. This negative potential is sufficient to overcome the normal positive bias at this point and transistor Q4 assumes its conducting condition.

As described, transistors Q6 are in their conducting condition due to the negative potential on bus HO. However, transistor Q6(N) also has a negative potential applied to its base through the set windings of assembly TFA(N) over the set buses F, G, H, J, and K, as appropriate, from the signals stored in assembly TFA$(N+1)$. However, resistor R13 in this connection to the base of transistor Q6(N) limits the current flow to a sufficiently low value to avoid any permanent set into the set windings of assembly TFA(N). This negative potential applied to the base of transistor Q6(N) is sufficient, by itself, to cause this transistor to become and hold conducting.

Transistor Q2(N) is cut-off at this time due to the positive bias on its base, there being no negative potential over the connection from the collector of transistor Q4 of this same stage since this latter transistor is conducting and thus its collector is at relative ground potential. Transistor Q3(N) is also held cut-off by its normal positive bias on the base since transistor Q4$(N-1)$ is conducting. Thus no negative potential is available from its collector over the connection through terminal 17/27 to the base of transistor Q3(N). It is also to be noted that the potential at this instant on bus CA is positive and that the positive bias on the base of transistor Q2(N) is sufficient to overcome the negative potential presently existing on bus TR.

When the negative potential on bus HO ends, at condition 5 in the wave form chart, transistor Q6$(N-1)$ cuts-off, since there is no signal in assembly TFA(N) to feed through the set windings of assembly TFA$(N-1)$ to the base of this transistor. Transistor Q5(N) thus changes to its conducting condition since a negative potential is applied to its base from the collector of transistor Q6$(N-1)$ over the connection through terminal 16/26 and rectifier D16(N). Transistor Q6(N), however, remains conducting since the negative potential applied as a result of the signal stored in assembly TFA$(N+1)$ is sufficient to retain a negative potential on the base of this transistor. Transistor Q4(N) now cuts-off, the negative potential through rectifier D15 of this stage from the collector of associated transistor Q5 having been removed due to the change in conducting condition of this latter transistor. As was previously explained, no negative potential exists at the collector of transistor Q6(N) and thus cannot be applied through the corresponding rectifier D14 to the base of the associated transistor Q4. When transistor Q4(N) cuts off, its collector assumes approximately the potential of terminal N to which this collector is connected through resistor R20.

The negative potential existing on the collector of transistor Q4(N) is applied through associated rectifier D17 to the base of transistor Q5(N). This latter transistor is already in a conducting condition but this connection through rectifier D17 provides a stick circuit so that this transistor remains conducting even after pulse condition 1 occurs to cause transistor Q6$(N-1)$ to again conduct and remove the negative potential applied through terminal 16/26. As previously explained, with transistor Q5(N) conducting, the associated transistor Q4 is held cut-off, thus completing the stick circuit action. This stick circuit holds until a negative potential is applied through rectifier D14(N) which occurs only after the proper transfer and cancel actions to set the stored signal into stage N, as will appear shortly. The negative potential existing at the collector of transistor Q4(N) also primes the associated transistor Q2 by a connection through resistor R16 to its base so that this latter transistor will become conducting upon the next occurrence of wave form condition 2. Finally, the negative potential at the collector of transistor Q4(N) is applied through terminal 17/27 to the base of transistor Q3($N+1$), thus priming this latter transistor to conduct at the next occurrence of wave form condition 3.

A short time later, wave form condition 1 occurs, applying negative potential from bus HO to all transistors Q6 through associated rectifiers D11. However, there is no action in stage N since transistor Q6 of this stage is already conducting as previously explained. Transistors Q6 of the remaining stages not already conducting, for similar reasons, become conducting at this time. In the following quiet period, indication lamps L1 to L5 of stage ($N+1$) reach their steady state condition, thus preparing for a smooth transfer of the signal stored in assembly TFA($N+1$) into the corresponding devices of stage N.

After this quiet period, wave form condition 2 occurs, at which time the potential applied to bus TR becomes approximately ground potential, thus removing the transfer clamp, that is, positive potential, from this bus. Transistor Q2(N) immediately becomes conducting since it is already primed by the negative potential on its base from the collector of associated transistor Q4. This completes the setting circuits for stage N through the emitter-collector path of transistor Q2(N). The signals stored in assembly TFA($N+1$) are now set into the similar devices of assembly TFA(N). Under the conditions assumed, setting pulses occur over setting lines F and J between these two stages. A circuit may be traced from the ground terminal through the emitter-collector circuit of transistor Q2(N), the set winding of level J of assembly TFA(N), set bus line J to assembly TFA($N+1$), the output winding of level J of this latter assembly, and the ground terminal to the beginning of the circuit traced. A similar circuit exists between level F of these two magnetic unit assemblies. This action thus transfers the signal code combination stored in stage ($N+1$) into stage N, although the signal continues to exist in assembly TFA($N+1$) until cancelled, as will be shortly described.

When pulse condition 3 shortly follows, the cancel clamp, that is, positive potential, is removed from bus CA. Transistor Q3($N+1$) immediately conducts since it is already primed by negative potential from the collector of transistor Q4(N) over the circuit previously traced. This completes the circuit for the block windings of assembly TFA($N+1$), the circuit extending from the ground terminal through the emitter-collector path of transistor Q3($N+1$), resistor R19, and the block windings at all levels in series to terminal N. The flow of current through this circuit cancels the signals stored in the F and J levels at this stage and the outputs from assembly TFA($N+1$) cease. The clamping potentials on buses TR and CA are shortly reapplied, as is obvious from a study of the wave form chart of FIG. 3.

Wave form condition 5 follows shortly thereafter, removing the negative potential from bus connection HO. Transistor Q6(N) now cuts-off upon the removal of this negative potential from its base, applied through rectifier D11, since the negative potential formerly applied through the set windings and set buses from assembly TFA($N+1$) has been eliminated by the cancellation of this signal from stage ($N+1$). A negative potential is now applied from the collector of transistor Q6(N) through associated rectifier D14 to the base of corresponding transistor Q4, causing this latter transistor to become conducting. Transistor Q4(N) will remain conducting with the code stored in the corresponding assembly TFA. Likewise, with a signal stored in stage N, transistor Q6($N-1$) remains conducting, although the negative potential has been removed from bus HO, due to the negative signal applied to its base from the output windings of assembly TFA(N) through the set buses and the set windings of assembly TFA($N-1$). This is the same action as was originally described under the initial condition for transistor Q6 of stage N. With transistor Q6($N-1$) remaining in the conducting condition, all negative potential is removed from the base of transistor Q5(N) since the collectors of transistor Q4(N) and Q6($N-1$) are now both at ground potential. Transistor Q5(N) thus cuts-off and will remain cut-off as long as transistor Q6($N-1$) remains conducting. With transistor Q5(N) cut-off, negative potential is applied through rectifier D15 to the base of associated transistor Q4, retaining it in its conducting condition. Again the stick circuit action is completed by the continued removal of the application of any negative potential from the collector of transistor Q4(N) through rectifier D17 to the base of associated transistor Q5. Thus as long as the signal remains stored in stage N and transistor Q6($N-1$) remains conducting, transistors Q4 and Q5 of stage N will hold conducting and cut-off, respectively, thus indicating that the stage is occupied and no further transfer into this stage can be made.

When stage ($N-1$) becomes empty of any storage, transistor Q4 of that stage will cut-off in the same manner as previously described for the corresponding transistor of stage N. This action primes transistor Q2($N-1$) to actuate the transfer of the storage now retained in stage N. This action, which is similar to that previously described for the transfer into stage N, occurs at the next wave form condition 2 after stage ($N-1$) empties. The cut-off of transistor Q4($N-1$), also primes transistor Q3(N) to become conducting at the next wave form condition 3. This latter transistor completes the circuit through the block windings of assembly TFA(N) and thus cancels the storage held in this assembly bank. This, of course, occurs after this storage has been set into the succeeding stage magnetic storage device. Transistor Q6($N-1$) will cut-off when the potential is next removed from bus HO, thus causing transistor Q5(N) to become conducting to indicate that this stage is now empty and ready to receive a storage transfer.

It can thus be seen that when stage N is empty and a code is not present in stage ($N+1$), transistor Q5(N) holds associated transistor Q4 conducting, by negative potential applied through rectifier D15, during the period that the negative potential exists on bus HO and transistor Q6($N-1$) is conducting. Transistor Q6(N) holds associated transistor Q4 conducting through rectifier D14 during the period that the potential is removed from bus HO, that is, from condition 5 to condition 1. Capacitor C8 connected between the common junction of rectifiers D14 and D15 and the ground terminal, as illustrated in FIG. 1, is provided to assure that transistor Q4 of that stage remains conducting during the transition periods of the hold pulse potential.

I shall now describe the input arrangement for the initial stage of the series of adjacent storage stages. The input circuit for the initial stage, that is, the highest numbered storage stage, is changed to assure an immediate registry of a received signal. This eliminates any delay in waiting for the timing pulses, which delay might result in loss of the incoming signal. In the upper left of FIG. 1, contacts *a* to *e*, inclusive, close in the preselected combination to establish the input code signals to the system. In a train designation installation, these contacts may be controlled manually by an operator of an interlocking or station area or may be controlled automatically by a train identification system which records the identity of approaching or passing trains. In any system using my invention, the contacts will be closed by any desired means to establish the code signals, the input thus being of random nature.

The normal hold pulse connections are not used for this initial stage and the two subsequent stages of the series. On the dot-dash rectangle designated as the input circuit in the upper left of FIG. 1, two special hold pulse terminals are indicated, designated as hold X and hold Z. The hold X terminal is connected to each of the input circuits through a separate resistor while the hold Z terminal is connected through rectifier D18, positioned as shown, and the corresponding resistors to the same input circuits. It is to be noted that hold Z terminal is also connected through rectifier D19 to hold bus HO. Rectifiers D18 and D19 are oppositely positioned so as to allow only an application of negative potential to hold Z terminal. Capacitor C10 is used to maintain negative potential on these terminals for a period after the contacts open. In the chart of FIG. 3, the lower wave form is that of special hold Y pulses which vary from the normal pulses on bus HO in that the negative potential is applied only between conditions 2 and 4 of the complete cycle. These pulses may be obtained by a special connection to the pulse generator. Connection is then made from hold X terminal of the input circuit to transistor Q6 of the initial stage in lieu of the usual connection to bus HO. The hold Y bus is connected in a similar manner to the first adjacent stage succeeding the initial stage while the hold Z terminal is connected to transistor Q6 of the second succeeding stage after the initial stage. In other words, assuming an installation having 10 storage stages, the base of transistor Q6 is connected to hold X terminal in stage 10, to hold Y bus in stage 9, and to hold Z terminal in stage 8.

It is now assumed that the initial and first succeeding stage of the system are empty of any signal storage and that at least one of the input contacts *a* to *e* closes. Stage N, as shown in FIG. 1, can be considered for purposes of this description as the initial stage, that is, in the specific example, stage 10. One terminal of each set winding of stage 10 is connected to terminal N through the corresponding set bus, the rectifier and resistor of the input circuit, and the closed input contact. However, this signal is not yet set into stage 10 since corresponding transistor Q2 is not yet conducting to complete the circuit. It is to be noted that there is no connection from the base of transistor Q2 of the initial stage through rectifier D13 to transfer bus TR. Transistor Q6 of stage 10 now becomes conducting as a result of the negative potential signal applied through the input circuits, the set windings, and resistor R13 to the base of this transistor. Transistor Q6(10) holds conducting when capacitor C10 of the input circuit charges and retains the negative potential applied through hold X terminal, rectifier D11, and resistor R11 to the base of this transistor. Transistor Q6(8) also becomes conducting, negative potential being applied over the input contacts, and retained as a result of the charging of capacitor C10, through rectifier D18, hold Z terminal, and rectifier D11 and resistor R11 of stage 8 to the base of transistor Q6 of that stage. Under certain conditions of the wave form, this transistor may already be conducting due to negative potential applied from bus HO through rectifier D19 to the hold Z terminal and thence as traced. With transistor Q6(8) conducting, negative potential from its collector is removed from the base of transistor Q5(9), causing this transistor to cut-off, simulating that stage 9 is full or occupied so that no transfer of the signal from stage 10 to stage 9 is possible at this time.

Transistor Q6 of stage 9, as previously mentioned, has a special hold connection to hold Y bus so that this transistor normally conducts for only a short time during each cycle. Conversely, transistor Q5(10) normally conducts for all but a short period during each of the timing cycles, since it is controlled by the potential at the collector of transistor Q6(9) via terminals 16/26 and rectifier D16. When transistor Q6 of the initial stage becomes conducting, as previously explained, the associated transistor Q4 cuts-off shortly as a result of the removal of all negative potential from its base, applied through rectifiers D14 and D15 from the collectors of associated transistors Q6 and Q5. Transistor Q5(10) thus remains continuously conducting through the action of the stick circuit from the collector of associated transistor Q4 through rectifier D17. When transistor Q4(10) cuts-off, the corresponding transistor Q2 becomes immediately conducting and completes a circuit for setting the input signal into assembly TFA of stage 10. This action occurs since there is no connection to the base of this transistor Q2 from bus TR and the collector of transistor Q4 of the same stage is now at negative potential.

Transistor Q6(9) now becomes conducting as a result of the signal from stage 10 through the set buses and the set windings of assembly TFA of stage 9. However, transfer of the signal is not possible with transistor Q5(9) cut-off. The signals are thus stored in stage 10 until the input contacts release to prevent any further change in the input signal. Release of the contacts cuts off transistor Q6(10) by removing the negative potential from hold X terminal. Transistor Q4(10) now becomes conducting as a result of the negative potential applied through rectifier D14 from the collector of associated transistor Q6. Transistors Q2 and Q5 of this stage now cut-off since the collector of associated transistor Q4 is at ground potential. However, transistor Q6(8) cuts-off only at the next pulse condition 5, this action occurring because terminal hold Z of the input circuits is retained at negative potential, after the input contacts have released, by its connection to bus HO through rectifier D19. Transistor Q5(9) now becomes conducting, negative potential being applied to its base through terminal 16/26 and rectifier D16 of the associated stage. Transistor Q4(9) cuts-off with both transistors Q5 and Q6 of this stage in a conducting condition. This primes transistor Q2(9) so that, when positive potential is next removed from bus TR, this transistor becomes conducting and transfers the signal stored in stage 10 into the set windings of assembly TFA(9). At this time, the negative potential supplied by the hold Y pulse to the base of transistor Q6(9) holds this transistor conducting, the collector of transistor Q2 of the corresponding stage now being at ground potential. Transistor Q6(9) thus holds in its conducting condition until the proper transfer and cancel actions have occurred, after which it cuts-off and the associated transistor Q4 becomes conducting. From this point, the normal sequence of transfer actions, controlled by the timing pulses in the manner previously described, continues through the remaining stages.

It is thus to be seen that the system of my invention provides an improved arrangement for transferring signals through a series of storage stages in which the storage device is of the magnetic storage type. Control circuits utilize semi-conductors such as transistors and half-wave rectifiers or other diodes to control the transfer action in a sequential manner with a minimum of apparatus. Transfer action occurs in a normal sequence as timed by the pulses provided from a generator over the various pulse buses. In addition, transfer into a storage stage can occur only if that stage is in an unoccupied condition and a storage is available in the preceding stage for transfer. During the time the signal is stored in a stage, the transfer and control circuit arrangement is so conditioned as to block the further transfer of any other signal into that stage and holds the signal thus stored until the succeeeding stage is in a condition, that is, an unoccupied condition, so that it may receive the signal in the proper manner. When a transfer is completed from one stage to a succeeding stage, it is cancelled in the stage from which it was transferred so that further action transferring following signals may occur in the usual sequence.

Although I have herein shown and described but one form of signal storage and transfer circuits embodying my invention, it is to be understood that various changes and modifications may be made therein within the scope of the appended claims without departing from the spirit and scope of my invention.

Having thus described my invention, what I claim is:

1. A signal storage and transfer system, comprising in combination, a series of successive storage banks each capable of storing a discrete signal therein, a circuit means connecting each pair of adjacent storage banks for at times transferring a signal stored in one bank into the subsequent bank of the pair, a control means for each of said storage banks, one of said control means connected to an associated bank and a preceding bank to be jointly responsive to the absence of a signal in said associated bank and to the presence of a signal in said preceding bank for initiating a signal transfer action, a source of timing pulses connected for supplying successive preselected cycles of timing pulses to each of said control means, said timing pulses actuating said one of said control means to complete an initiated transfer action of said signal from said preceding bank to said associated bank at a selected time in said cycle, said one of said control means having a connection to the circuit means connecting said associated bank and said preceding bank for effecting a signal transfer into the associated bank when said one of said control means has responded to conditions of said banks and is actuated by said timing pulse source.

2. A signal storage and transfer system comprising in combination, a series of successive storage banks each capable of storing a discrete signal therein, circuit means connected between each pair of adjacent storage banks for at times transferring a discrete signal stored in one bank into the subsequent bank of the pair a source of timing pulses for supplying successive preselected cycles of timing pulses, a control means for each of said storage banks and having connections to said pulse source, one of said control means connected to an associated bank and a preceding bank to be jointly responsive to the absence of a signal in said associated bank and the presence of a discrete signal in said preceding bank for initiating a signal transfer action when a predetermined point in a particular pulse cycle is reached, said pulse source further controlling said one of said control means for actuating that control means to complete the initiated transfer action when another predetermined point in a subsequent pulse cycle is reached, said one of said control means having connections to the circuit means between said associated bank and said preceding bank for effecting a signal transfer into said associated bank when said one of said control means has responded to the signal occupancy conditions of these banks and is actuated by said pulse source.

3. In a signal transfer system having a plurality of successive signal storage stages and having associated therewith a source of timing pulses supplying successive cycles of a predetermined pulse form, at each stage the combination comprising, a signal storage bank capable of storing discrete signals entered therein, circuit means interconnecting each of said storage banks for transferring signals stored in a bank of the preceding storage stage, a transfer control means having connections to said pulse source and to an associated bank of a stage and to said preceding storage bank, said transfer control means responsive to the absence of a signal in said associated storage bank and to the presence of a signal stored in said bank of said preceding stage for initiating a transfer of the stored signal into said associated storage bank when a preselected point in said pulse cycle is next reached, said transfer control means having connections to said circuit means and further controlled by said pulse source for completing the transfer of the signal from said bank of said preceding stage into said associated bank when another preselected point in a succeeding pulse cycle is reached.

4. A train describer system comprising, a successive series of storage banks each capable of storing discrete signals entered therein, each bank having interconnections to the succeeding bank for at times transferring a stored signal into that succeeding bank, a transfer control means for each storage bank, a pulse source for supplying successive cycles of timing pulses, each transfer control means electrically connected to an associated bank and a preceding bank and being jointly controlled by said associated bank and said preceding bank for initiating a signal transfer when said associated bank is in a signal unoccupied condition and said preceding bank holds a signal storage, each transfer control means being further controlled by said pulse source and having connections to the interconnections from the preceding bank for actuating a signal transfer from the preceding bank into the associated bank at a preselected point in the pulse cycle following the conditioning of that control means, a signal input means having connections for supplying a discrete signal indicating a particular train designation to the initial storage bank of said series, and a display means controlled by the final storage bank for indicating the train designation signal stored therein.

5. A signal storage and transfer system comprising in combination, a series of successive magnetic storage banks each capable of storing a discrete signal therein, circuit connections between each pair of adjacent storage banks for at times transferring a discrete signal stored in one bank into the subsequent bank of the pair, a pulse source for supplying successive cycles of timing pulses, an entry transistor electrically connected to said pulse source associated with each bank and responsive to a particular portion of the timing pulse cycle for periodically changing condition and reverting to a normal condition, each entry transistor electrically connected to said circuit connections between an associated bank and a preceding bank, said entry transistors controlled by said circuit connections from the preceding bank for holding only in its normal condition when the associated bank is devoid of a signal and a signal is stored in the preceding bank, a master transistor associated with each bank electrically connected to said pulse source through said entry transistor, said master transistor controlled by said pulse source and the corresponding entry transistor to assume a preselected condition when said corresponding entry transistor holds in its normal condition during said particular portion of a pulse cycle, said master transistor having means electrically connected to said master transistor and said circuit connections from said preceding bank to control a transfer of the signal stored in said preceding bank when said master transistor holds in its preselected condition during a subsequent pulse cycle.

6. A signal storage and transfer system comprising in combination, a series of successive magnetic storage banks each capable of storing a discrete signal therein, circuit connections between each pair of adjacent storage banks for at times transferring a discrete signal stored in one bank into the subsequent bank of the pair, a pulse source for supplying successive cycles of timing pulses, an entry transistor associated with each bank electrically connected to said pulse source and responsive to a particular portion of the timing pulse cycle for periodically changing condition and reverting to normal condition, each entry transistor electrically connected to said circuit connections between an associated bank and a preceding bank, said entry transistors controlled by the circuit connections from the preceding bank for holding only in its normal condition when the associated bank is empty and a signal is stored in the preceding bank, a master transistor associated with each bank electrically connected to said pulse source through said entry transistor, said master transistor controlled by said pulse source and the corresponding entry transistor to assume a preselected condition when said corresponding entry transistor holds in its normal condition during said particular portion of a pulse cycle, said circuit connections into each bank being controlled by said pulse source and by the corresponding master transistor for transferring the signal stored in said preceding bank into the associated bank during a subsequent pulse cycle when said corresponding master transistor assumes and holds in its preselected condition.

7. In a signal storage and transfer system including a series of successive magnetic storage banks each capable of storing a discrete signal therein, circuit connections between each pair of adjacent storage banks for at times transferring a discrete signal stored in one bank into the subsequent bank of the pair, and a pulse source for supplying successive cycles of timing pulses; in combination with each storage bank, an entry transistor electrically connected to said pulse source and responsive to a particular portion of the timing pulse cycle for periodically changing condition and reverting to a normal condition, said entry transistor electrically connected to said circuit connection from the preceding bank and controlled through said electrical connection to hold only in its normal condition when the associated bank is devoid of a signal and a signal is stored in the preceding bank, a master transistor electrically connected to said pulse source through said entry transistor, said master transistor controlled by said pulse source and said entry transistor to assume a preselected condition when said entry transistor holds in its normal condition during said particular portion of a pulse cycle, said circuit connections from the preceding bank being controlled by said pulse source and by said master transistor for transferring the signal stored in said preceding bank into the associated bank during a subsequent pulse cycle when said master transistor assumes and holds in its preselected condition.

8. In a signal storage and transfer system including a series of successive magnetic storage banks each capable of storing a discrete signal therein, circuit connections between each pair of adjacent storage banks for at times transferring a discrete signal stored in one bank into the subsequent bank of the pair, and a pulse source for supplying successive cycles of timing pulses; in combination with each storage bank, an entry transistor electrically connected to said pulse source and responsive to a particular portion of the timing pulse cycle for periodically changing condition and reverting to normal condition, said entry transistor electrically connected to said circuit connections from the preceding bank and controlled through said electrical connections to hold only in its normal condition when the associated bank is devoid of a signal and a signal is stored in the preceding bank, a master-busy transistor arrangement electrically connected to said pulse source through said entry transistor, said master-busy transistor controlled by said pulse source and by said entry transistor and having at least a first and a second condition, said master-busy transistor arrangement holding in its first condition when a signal is stored in the associated bank and holding in its second condition when said entry transistor holds in its normal condition during said particular portion of a cycle, said circuit connections from said preceding bank to said associated bank being controlled by said pulse source and by master-busy transistor arrangement for transferring the signal stored in said preceding bank into the associated bank during a subsequent pulse cycle when said master-busy transistor is holding in its second condition.

9. A signal storage and transfer system comprising in combination, a series of successive magnetic storage banks each capable of storing a discrete signal therein, circuit connections between each pair of adjacent storage banks for at times transferring a discrete signal stored in one bank into the subsequent bank of the pair, a pulse source for supplying successive timing pulse cycles each comprising a series of pulses having a preselected time relationship, an entry transistor associated with each bank electrically connected to said pulse source and controlled by said pulse source for changing from a normal to another condition during a first pulse period of each pulse cycle, each entry transistor electrically connected to said circuit connections from the preceding bank and controlled through said electrical connections to hold only in its normal condition when a signal is stored in the preceding bank, a master-busy transistor arrangement associated with each bank electrically connected to the entry transistor of the succeeding bank and controlled by the entry transistor associated with the succeeding bank for holding in a first condition when a signal is stored in the associated bank, said master-busy transistor arrangement electrically connected to said associated entry transistor and controlled by the associated entry transistor for assuming a second condition when said associated bank is empty and said associated entry transistor holds in its normal condition during said first pulse period, a stick circuit for holding said master-busy transistor arrangement in its second condition while said associated entry transistor holds in its normal condition, and a transfer transistor associated with each bank and controlled by said pulse source and by the corresponding master-busy transistor arrangement and having connections to said circuit connections from the preceding bank for actuating a transfer of a signal from said preceding bank into said associated bank during a second pulse period of a cycle when said corresponding master-busy transistor arrangement holds in its second condition.

10. A signal storage and transfer system comprising in combination, a series of successive magnetic storage banks each capable of storing a discrete signal therein, circuit connections between each pair of adjacent storage banks for at times transferring a discrete signal stored in one bank into the subsequent bank of the pair, a pulse source for supplying successive timing pulse cycles each comprising a series of pulses having a preselected time relationship, an entry transistor associated with each bank and controlled by said pulse source for changing from a normal to another condition during a first pulse period of each pulse cycle, each entry transistor being further controlled by the circuit connections from the preceding bank for holding only in its normal condition when a signal is stored in the preceding bank, a master-busy transistor arrangement associated with each bank and controlled by the entry transistor associated with the succeeding bank for holding in a first condition when a signal is stored in the associated bank, said master-busy transistor arrangement being controlled by the associated entry transistor for assuming a second condition when said associated bank is devoid of a signal and said associated entry transistor holds in its normal condition during said first pulse period, a stick circuit associated with each bank and electrically connected to said master-busy transistor for holding said master-busy transistor arrangement in its second condition while said associated entry transistor holds in its normal condition, a transfer transistor associated with each bank and controlled by said pulse source and by the corresponding master-busy transistor arrangement and having connections to said circuit connections from the preceding bank for actuating a transfer of a signal from said preceding bank into said associated bank during a second pulse period of a cycle when said corresponding master-busy transistor arrangement holds in its second condition, and a cancel transistor associated with each bank and controlled by said pulse source and by the master-busy transistor arrangement associated with the succeeding storage bank and having connections to the associated storage bank for cancelling a signal stored therein during a third pulse period of a cycle when the succeeding master-busy transistor arrangement is in its second condition.

11. In a signal storage and transfer system including a series of successive magnetic storage banks each capable of storing a discrete signal therein, circuit connections between each pair of adjacent storage banks for at times transferring a discrete signal stored in one bank into the subsequent bank of the pair, and a pulse source for supplying successive timing pulse cycles each comprising a series of pulses having a preselected time relationship; in combination with each storage bank, an entry transistor normally controlled by said pulse source to change from a first to a second condition during a first pulse period of each pulse cycle, said entry transistor being controlled by the circuit connections from the preceding bank to hold only in its first condition when a signal is stored in the preceding bank, a master-busy transistor arrangement controlled by the entry transistor associated with the succeeding bank for holding in a first condition when a signal is stored in the associated bank, said master-busy transistor arrangement being controlled by the associated entry transistor for assuming a second condition when said associated bank is devoid of a signal and said entry transistor holds in its first condition during said first pulse period, a stick circuit electrically connected to said master-busy transistor for holding said master-busy transistor arrangement in its second condition while said entry transistor holds in its first condition, a transfer transistor controlled by said pulse source and by said master-busy transistor arrangement and having connections to the associated bank for actuating a transfer of a signal over said circuit connections from said preceding bank into said associated bank during a second pulse period of a cycle only when said master-busy transistor arrangement is holding in its second condition, and a cancel transistor controlled by said pulse source and by the master-busy transistor arrangement associated with the succeeding storage bank and having connections to the associated storage bank for cancelling a signal stored therein during a third pulse period of a cycle when the succeeding master-busy transistor arrangement is in its second condition.

References Cited by the Examiner

UNITED STATES PATENTS

| | | | |
|---|---|---|---|
| 2,933,563 | 4/1960 | Hohmann | 179—18 |
| 3,011,159 | 11/1961 | Glaser et al. | 340—174 |
| 3,063,038 | 11/1962 | Davis et al. | 340—174 |
| 3,125,744 | 3/1964 | Olson | 340—174 |
| 3,140,472 | 7/1964 | Adams et al. | 340—174 |
| 3,146,427 | 8/1964 | Edstrom | 340—174 |

IRVING L. SRAGOW, *Primary Examiner.*

JOHN F. BURNS, BERNARD KONICK, *Examiners.*